Sept. 17, 1929.  W. F. EAMES  1,728,790

CONTROL SYSTEM

Filed May 14, 1927

Direction Switch Cut Off.

WITNESSES:
A. J. Schiefelbein.
H. W. Mattingly

INVENTOR
William F. Eames
BY
Wesley G. Carr
ATTORNEY

Patented Sept. 17, 1929

1,728,790

UNITED STATES PATENT OFFICE

WILLIAM F. EAMES, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed May 14, 1927. Serial No. 191,359.

My invention relates to control systems for electric motors and has particular reference to control systems for elevators, hoists and similar machinery.

One object of my invention is to provide a control system wherein a motor operating under varying load conditions may be stopped accurately within a predetermined time.

Another object of my invention is to provide a control system for elevator motors wherein the elevator may be stopped accurately level with the floors of a building, regardless of the variation of the load upon the elevator.

The principle involved in the practice of my invention is the introduction of a predetermined amount of resistance in circuit with an auxiliary field winding for the generator of a motor-generator set of the well-known Ward-Leonard type.

Figure 1:
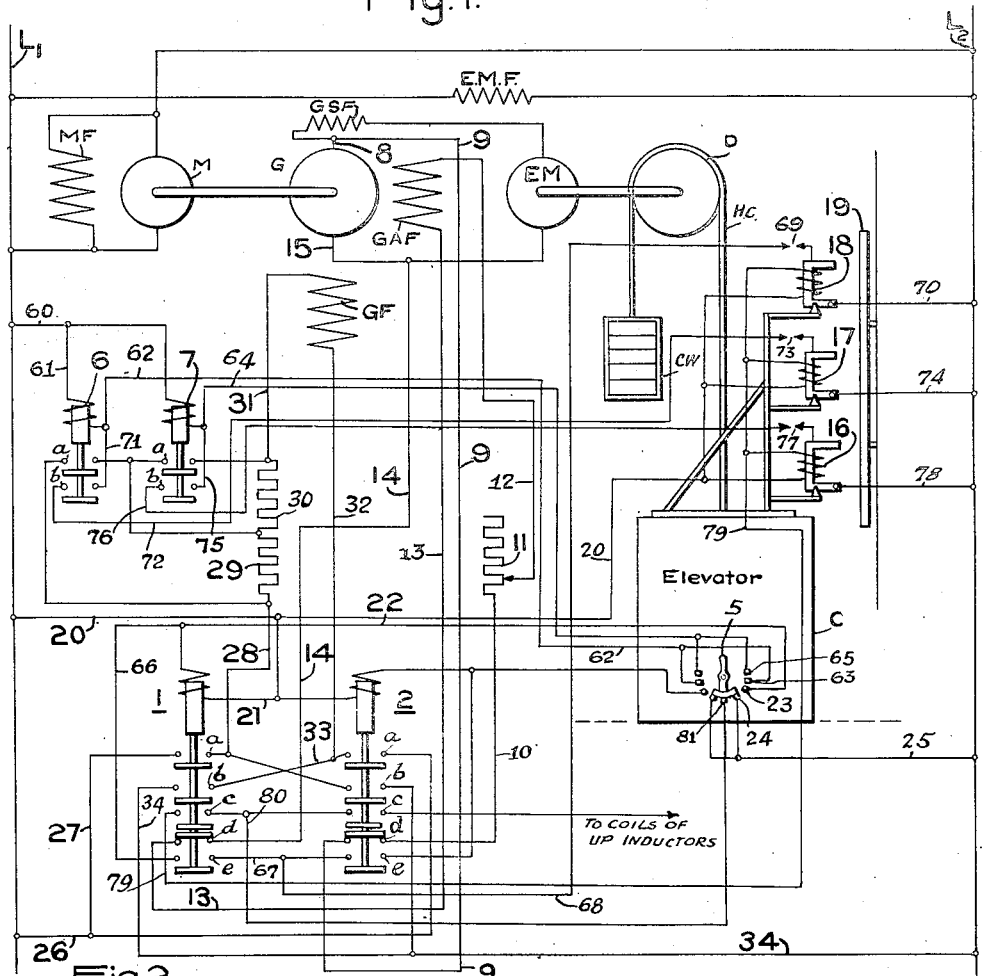
Figure 2:
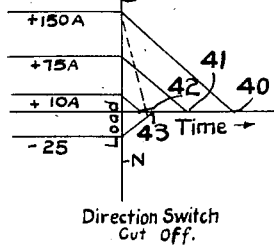
Figure 3:
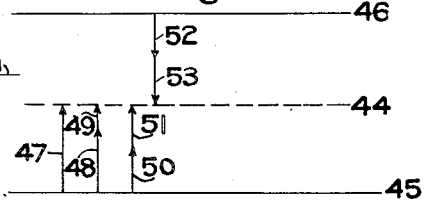

My invention is described in connection with the accompanying drawings, in which Fig. 1 is a diagrammatic view of an elevator, a motor-generator-motor set, and the control circuits therefor; and Figs. 2 and 3 are diagrammatic illustrations of the effects produced by the use of my invention to cause an elevator car to stop level with the floor.

Referring to the drawing, Fig. 1 shows a motor-generator-motor set of the Ward-Leonard type comprising a driving motor M, shown as a shunt motor, coupled directly to a generator G. The generator is provided with a series field winding GSF, a shunt field winding GF and an auxiliary field winding GAF. The elevator hoisting motor EM, which is connected directly to a hoisting drum D, has its armature connected in a "loop" circuit with the generator armature G and the generator series field winding GSF. The field winding EMF of the elevator hoisting motor EM is connected directly across the supply circuit conductors L1 and L2. An elevator car C is balanced by a counterweight CW connected to opposite ends of a hoisting cable HC, which passes over the hoisting drum D in a well-known manner.

The generator shunt field winding GF is shown as capable of being selectively connected across the supply circuit conductors L1 and L2, the current being transmitted in reverse directions by means of a pair of "down" and "up" reversing switches 1 and 2 to thus cause the generator to supply the motor armature with voltage in reverse directions, whereby the elevator may be raised or lowered selectively. The "up" and "down" reversing switches are shown as being controlled by the car switch 5, mounted on the car, but they may be controlled in any other suitable manner, as for example, by suitable push-button relay systems as in the case of automatically operated push-button controlled elevators.

In series relation with the generator shunt field winding GF are shown a pair of resistors adapted to be short-circuited by a pair of speed relays 6 and 7, respectively, to produce two steps of motor speed in the usual manner.

An auxiliary field winding GAF is provided for the generator, being connected across the generator armature when the elevator is to be stopped, for the purpose of quickly reducing the residual magnetism in the generator field structure. This connection is made by a pair of normally closed contact members on each of the reversing switches 1 and 2, which complete a circuit extending from the generator armature terminal 8, through conductor 9, contact members 2d, conductor 10, adjustable resistor 11, conductor 12, auxiliary field winding GAF, conductor 13, contact members 1d and conductor 14 to the generator armature terminal 15. The circuit for the axiliary field winding is, therefore, closed only at such times as both of the reversing switches 1 and 2 are de-energized.

To automatically control the elevator for accurate stopping, a plurality of inductor relays 16, 17 and 18 are shown carried by the car for cooperation with an inductor plate 19, mounted in the hatchway in the manner shown in the copending application of E. M. Bouton, Serial No. 731,921, filed Aug. 14, 1924. These inductor relays per se are preferably of the type disclosed in a copending application of John F. Clancy, Serial No. 559,997, filed May 11, 1922, and are of the type wherein the coil of the relay is ineffective, when energized, to actuate the switch controlled thereby until an inductor plate is brought adjacent to the relay. At such times the energized coil will be rendered effective to control the switch.

In the application of the system thus far described we may assume that the elevator is to travel downwardly. The car switch lever 5 is moved to the right, closing a circuit for the "down" direction switch 1 which extends from line conductor L1 through conductors 20 and 21, coil 1, conductor 22, contact members 23 and 24 of the car switch, and conductor 25 to line conductor L2. This circuit energizes the coil of switch 1, closing contact members 1a and 1b, and thus supplies the generator shunt field winding GF with current by way of a circuit extending from line conductor L1 through conductors 26 and 27, contact members 1a, conductor 28, resistors 29 and 30, conductor 31, generator shunt field winding GF, conductors 32 and 33, contact members 1b, and conductor 34 to line conductor L2.

The car will, therefore, start downwardly. If it is desired that the car operate at higher speeds, the car-switch lever 5 may be moved farther in a counter-clockwise direction to successively complete circuits for energizing speed relays 6 and 7 to cause these relays to successively shunt resistor sections 29 and 30 from the circuit of field winding GF. The circuit for speed relay 6 extends from line conductor L1, through conductors 60 and 61, the coil of speed relay 6, conductor 62, contact members 63 and 24 on car switch 5 and conductor 25, to line conductor L2. The circuit for speed relay 7 extends from line conductor L1, through conductor 60, the coil of speed relay 7, conductor 64, contact members 65 and 24 on the car switch and conductor 25, to line conductor L2.

While the precise manner of stopping the elevator car forms no part of this invention, I have illustrated my invention as applied to a control system of the automatic-landing type, wherein, as described in the above identified copending application filed by E. M. Bouton, holding circuits are provided for the direction switches 1 and 2 and speed relays 6 and 7. Inductor relays 16, 17 and 18 are utilized to cause the car to automatically decelerate and stop level with a floor, as the car passes predetermined points adjacent the floor. While, for simplicity in the drawings, I have illustrated inductor relays for stopping the car when travelling in the downward direction only, it is assumed that a similar set of relays will cause stopping of the car when the car is travelling in an upward direction.

The self-holding circuits for direction switches 1 and 2 and speed relays 6 and 7 extend through normally closed contact members on the inductor relays 18, 17 and 16, respectively.

In our assumed operation, down-direction switch 1, when actuated, completes a self-holding circuit for itself, which extends from line conductor L1, through the coil of down-direction switch 1, as previously described, and thence extends, by way of conductor 66, contact members e of down-direction switch 1, conductors 67 and 68, contact members 69 of stopping inductor relay 18 and conductor 70, to line conductor L2. The holding circuit for speed relay 6 extends from line conductor L1, through the coil of speed relay 6, as previously described, and then extends by way of conductor 71, contact members b on speed relay 6, conductor 72, contact members 73 on slow down inductor 17 and conductor 74, to line conductor L2. The holding circuit for speed relay 7 extends from line conductor L1, through the coil of speed relay 7, as previously described, and thence extends, by way of conductor 75, contact members b on speed relay 7, conductor 76, contact members 77 on slow down inductor relay 16 and conductor 78, to line conductor L2.

It will, therefore, be observed that, as inductor relays 16, 17 and 18 are brought adjacent inductor plate 19, they will be successively actuated to deenergize, first, speed relay 7, then speed relay 6 and then down-direction switch 1.

It is desirable that the inductor relays 16, 17 and 18 should not be energized except when it is desired to stop the car at a floor, and, for this reason, I have provided contact members on the car switch which will be closed only when the car switch is moved to its car-stopping or illustrated position. With the car switch in this position, a circuit will be completed, energizing the coils of inductor relays 16, 17 and 18, which circuit extends from line conductor L1, through conductor 20 thence, in parallel relation, through the coils of inductor relays 16, 17 and 18, conductor 79, contact members c on down-direction switch 1, conductor 80, contact members 81 and 24 on the car switch and conductor 25, to line conductor L2. It will thus be seen that the elevator car will be decelerated and brought to a stop level with the floor with which inductor plate 19 is associated and, by arranging the relative spacing of inductor relays 16, 17 and 18 and the length of inductor plate 19, the distance, during which this deceleration will occur, may be adjusted to fit the operating characteristics of the driving motor EM.

When the generator shunt field winding GF is deenergized, the voltage produced by the generator will not be immediately reduced to zero, by reason of the inherent lag of the generator field flux in dying after field-excitation current is cut off and the self excitation of the series field winding GSF. This condition would cause the car to continue creeping upwardly indefinitely unless the field be demagnetized by some other means. In order to quickly reduce this field and, consequently, bring the voltage quickly to zero, the auxiliary field winding GAF is provided, being connected across the armature of the generator as previously described. The direction of the current in the armature being opposed to that in the shunt field winding, the effect of the auxiliary field winding will be to oppose this remaining magnetism in the generator. This action quickly demagnetizes the field and brings the voltage to zero.

For accurate landing, the time required for the generator voltage to reach zero after the opening of the direction switches should be proportional to the armature load current exciting the generator series field winding, and, hence, should be proportional to the load on the elevator. I have observed that there is a certain value of resistance which if placed in the circuit for the auxiliary field winding will make this time correct for stopping all loads at the floor level with accuracy.

The effect of this resistor is to retard the demagnetizing effect of field winding GAF, thereby continuing the lifting torque for a length of time proportional to the load lifted, in the case of "up" travel, or producing a continued dynamic braking for a time proportional to the load lowered, in the case of "down" travel.

This effect is illustrated in Fig. 2 wherein the horizontal line M represents time and the vertical line N represents load at the instant the direction or reversing switches drop out. Assuming a load of 150 amperes is required to lift the elevator under a given loading condition, the current will drop off at a rate illustrated by the angular line reaching 0 at a point on line M represented by 40. Under a lighter load such as 75 amperes, the current will drop off to a point represented by 41, while under no load on the car (balanced car) the current at the cut off point is only sufficient to lift the car, for example, 10 amperes. In this case, the current will reach 0 at a point represented by 42.

Under the condition of "down" travel, with a given load on the car, we may assume a negative current of 25 amperes. That is, the load is driving the motor and the motor is generating a current of 25 amps., tending to hold the elevator back. The current in this case will reach 0 at a point represented by 43.

Without the use of the resistor, the current would drop off at a sharper angle, as illustrated by the dotted line, and this condition gives the effect of an abrupt stop and is exceedingly inaccurate.

The elevator will not stop instantly when the brake is applied, but will "slide" through the brake a distance which is proportional to the load on the car.

If, therefore, the "slide" is balanced with a lifting torque or a braking torque, depending upon whether the elevator is going up or down, which torque is continued for a time proportional to the load, the car will always stop at a predetermined level.

Referring to Fig. 3, reference character 44 represents a floor level, reference character 45 represents the position of the elevator at the instant the "up" direction switch drops out, and reference character 46 represents the car position at the instant the "down" direction switch drops out. Assuming the elevator to be lifting a heavy load (150 amps. Fig. 2) the current reaches 0 at a point which is substantially at the floor level line 44, and when the brake is applied the car stops almost instantly, since the load acts with the brake to check the car. This condition is represented by the arrow 47.

In the case of a light load (75 amps. Fig. 2) the arrow 48 represents the extent of the lifting torque, while the arrow 49 represents the "slide" through the brake, the sum of which brings the car exactly to the floor level 44. The arrows 50 and 51 jointly illustrate the "no load" condition (10 amps. Fig. 2).

On "down" travel the same condition prevails, since the balance of a greater "slide" by a quicker cut off of current always stops the car accurately with the floor. Arrows 52 and 53, respectively, represent the "holding back" effect of the negative current load of 25 amps. and the slide caused by the load drifting through the brake.

The apparatus shown is illustrative only and I do not desire to be limited to the illustrated structural parts or system except as is defined in the appended claims.

I claim as my invention:

1. In an elevator control system including a car, a motor for moving said car, a generator having an armature for supplying current to said motor, the combination of a separately excited field winding for said generator, means for controlling the current in said tor, means for controlling the current in said separately excited field winding to control the operation of said motor, an auxiliary field winding for said generator, means connecting said auxiliary field winding to the armature of said generator when said separately excited field winding is de-energized to quickly reduce the strength of the generator field and a resistor of predetermined value in said auxiliary field circuit for producing a time lag in said reduction proportional to the net load on the elevator system.

2. In a control system for an elevator, a motor and a separately-excited generator having an armature for operating said motor, an auxiliary field winding for said generator, means for cutting off the excitation of the generator and for connecting said auxiliary field winding to said generator armature when the car is at a predetermined distance from a floor at which the elevator is to stop, said auxiliary field winding acting to quickly reduce magnetism in said generator, and a predetermined amount of resistance in said auxiliary field-winding circuit to thereby predetermine the time of said reduction proportionately to the load and to stop the car accurately level with the floor.

3. In an elevator control system, a car, a generator-motor control for said car having constant speed characteristics under varying load, means for stopping said car accurately level with a floor including a demagnetizing auxiliary field winding and a resistor, and means for connecting said auxiliary field winding and said resistor across the armature of said generator when the car is a predetermined distance from the floor.

4. In a control system for elevators, an elevator, a hoisting motor therefor, a compound wound generator, having an armature and an additional demagnetizing field winding, for operating said motor, means including magnetically actuated directional switches for selectively controlling said generator to cause the motor to move the car up or down, self holding means for said switches, inductor relay means for releasing said holding means when the car is at a predetermined distance from said floor, means controlled by the release of said directional switches for connecting said demagnetizing field winding to said generator armature and a resistor of predetermined value in the circuit for said demagnetizing field for delaying the action thereof to cause the car to stop accurately level with the floor.

5. In a motor control system of the Ward-Leonard type using a brake to stop the motor, means for stopping said motor accurately at a predetermined point under varying load conditions comprising an auxiliary demagnetizing field winding for the generator, a circuit therefor including a predetermined value of resistance in series relation with said field winding and means for connecting said circuit to the armature of said generator when said motor is to be stopped, to compensate by retarding the reduction of the generator field for the slippage through the brake for all load conditions.

6. In an elevator-control system, including a car, a motor for moving said car and a generator having an armature for supplying current to said motor, the combination of a separately excited field winding for said generator, means for controlling the current in said separately excited field winding to control the operation of said motor, an auxiliary field winding for said generator, means connecting said auxiliary field winding to the armature of said generator when said separately excited field winding is deenergized to quickly reduce the strength of the generator field and current-modifying means of predetermined value in said auxiliary field winding circuit for producing a time lag in said reduction proportional to the net load on the elevator system.

7. In an elevator-control system, including a car, a motor for moving said car and a generator having an armature for supplying current to said motor, the combination of a separately excited field winding for said generator, means for controlling the current in said separately excited field winding to control the operation of said motor, an auxiliary field winding for said generator, means connecting said auxiliary field winding to the armature of said generator when said separately excited field winding is deenergized to quickly reduce the strength of the generator field and means for producing a time lag in said reduction proportional to the net load on the elevator system.

In testimony whereof, I have hereunto subscribed my name this 5th day of May, 1927.

WILLIAM F. EAMES